United States Patent [19]

Hermanson

[11] 3,931,692

[45] Jan. 13, 1976

[54] INSECT EXTERMINATOR PAD

[76] Inventor: William A. Hermanson, 3700 Galt Ocean Drive, Fort Lauderdale, Fla. 33308

[22] Filed: Sept. 20, 1974

[21] Appl. No.: 507,776

[52] U.S. Cl. .................................. 43/131; 424/84
[51] Int. Cl.² ........................................ A01M 1/20
[58] Field of Search ............ 424/84; 161/51, 59, 79, 161/151–156; 43/131

[56] References Cited
UNITED STATES PATENTS

| | | |
|---|---|---|
| 2,808,679 | 10/1957 | Collins .................................. 43/131 |
| 3,033,721 | 5/1962 | Kalwaites ............................. 154/46 |
| 3,605,321 | 9/1971 | Lazarus ................................ 43/131 |

*Primary Examiner*—Hugh R. Chamblee
*Assistant Examiner*—Peter K. Skiff
*Attorney, Agent, or Firm*—Oltman and Flynn

[57] ABSTRACT

The present insect exterminating pad has a quantity of insecticidal food particles covered on top by a paper web which has openings at the inside covered by dispersed fibers that can be penetrated by the feelers and mouth parts of *Blatella germanica* cockroach nymphs. The food particles are covered on the bottom by Kraft paper that cannot be so penetrated.

11 Claims, 4 Drawing Figures

INSECT EXTERMINATOR PAD

BACKGROUND OF THE INVENTION

Dense habitation by people, due to inflated land costs, in highrise apartment buildings where living space is small and where hundreds to thousands of such apartments of restricted dimensions are linked together by vast plumbing and pipe connections, has been accompanied by extensive infestations, vertically as well as horizontally, by the genus and species *Blatella germanica*, commonly known as cockroaches or croton bugs.

Professional exterminators use residual insectidal oils in liquid form and high pressure spraying equivalents to attack this problem. However, due to the close living areas in individual apartments, such efforts to remedy the situation have had to be modified because of the toxicity of the insecticidal chemicals. Many people, particularly women, cannot tolerate the strong pervasive odors of the oils and syncope results. The spraying is directed around the floors adjoining walls which are used by the insects as runways, but such spraying can only be done in carefully aimed, cursory, light amounts. In fact, since these insecticidal residual oils are volatile, their effect wanes within 48 hours but, because of the toxic factor, cannot be used in areas such as china closets, cabinets in kitchens, shelves containing stored foods, or under kitchen and bathroom sinks where all kinds of household necessities such as detergents, cleaning and dusting cloths, soap, toilet paper, drugs, etc. are stored. Thus, the amount of space that can be covered by spraying is minimal. The spraying, therefore, must be frequent and expensive, while the toxicity gradient rises during the first 24 hours thereafter.

Cockroaches abide preferably in moist, dark spaces where they lay their eggs, for example, under sinks, shelves where pots and pans are kept, on plumbing fixtures such as pipes or traps, or on the wall spaces surrounding them. These nests, called egg cases, are only infrequently destroyed by spraying. Breaks in the plaster or cement of walls around the periphery of water pipes, where they are inserted through holes for connections between floors, are frequent at kitchen sinks, wash basins, bathroom toilets and shower connections. Spray nozzles do not reach these breaks. Unfortunately, workmen in construction neglect to secure circular metal shields (known in the plumbing trade as "escutcheons") around pipe holes to block them off because the spaces around traps are narrow and it is a backbreaking job. Through such breaks insects can crawl over pipelines for any number of stories.

Cockroaches lay eggs three times annually, and from each egg case anywhere from 30 to 50 young are hatched each time. These young nymphs are found mostly at floor level, or on lower floors of cabinets, or on shelf space, having traveled from under sinks or pipe connections in search of food. At this stage of life, they are under one millimeter in length and are barely visible to the naked eye. Since the egg cases are adhered to walls or pipes by insect secretion, it is obvious that eliminating them requires a better means than volatile sprays.

As the nymphs grow to adult size (nearly ¾ inch in length), the adults seek runways, cracks or any other sort of cover when disturbed in the search of food. In the adult stage they are substantially, but not exclusively, night crawlers. When a strong light is turned on, they "freeze" immobile. Light is to them the signal of danger. The nymphs, however, are diurnal crawlers as well and are less sensitive to the danger signal of light. Thus, it becomes apparent that any means directed against the reduction in numbers or the elimination of nymphs is most effective, since 15 to 25 females, when resulting from the hatching of one egg case containing 30 to 50 eggs, can produce 450 to 1,250 nymphs, and this can occur a second time during a year, subject to reduction in numbers only by variant environmental conditions.

One product offered for sale at retail is a small cardboard box which holds about ½ ounce of loose foodstuff that is lethal to cockroaches. It is opened at the perforations around a closure tab by finger pressure, whereupon the foodstuff particles pour out on the floor or shelf space, scattering about profusely. This is an effective idea for houses having cellars or attics or detached sheds or barns or outside garbage areas. However, in highrise apartments or inside homes or mobile homes where living space is minimal, it presents some major problems. The foodstuff contacts the fingers when opening the box and in use the particles, which are somewhat toxic to warm-blooded domestic animals, including humans, are strewn over surfaces and areas of floors, shelves, cabinets, etc., where they cannot be readily distinguished from other particulate matter thereon.

SUMMARY OF THE INVENTION

The present invention is directed to a novel insecticidal pad that is specially constructed to exterminate *Blatella germanica* cockroaches while they are young nymphs. The pad has a quantity of poison food particles covered on top by a paper web of special formation having openings on the inside which are larger than the feelers and mouth parts of cockroach nymphs. On the outside of the web these openings are covered by waterlaid, dispersed fibers which the feelers and mouth parts of such nymphs can readily penetrate between to reach the poison food through the openings. On the bottom the pad has a web, preferably of Kraft paper, that cannot be so penetrated. Preferably, this impenetrable bottom web projects beyond the pad at one end or at opposite ends to facilitate the handling of the pad without danger of toxic effects to humans.

A principal object of this invention is to provide a novel and improved insecticidal pad, particularly for exterminating *Blatella germanica* cockroach nymphs.

Another object of this invention is to provide such an insecticidal pad that is adapted to be placed wherever such insects are likely to be in the home and with minimal possibility of toxic effects or odor noticeable to human beings.

Further objects and advantages of this invention will be apparent from the following detailed description of certain presently-preferred embodiments thereof, shown in the accompanying drawing in which.

Before explaining the disclosed embodiments of the invention in detail it is to be understood that the invention is not limited in its application to the details of the particular embodiments shown, since the invention is capable of other embodiments. Also the terminology used herein is for the purpose of description and not of limitation.

Figure 1:
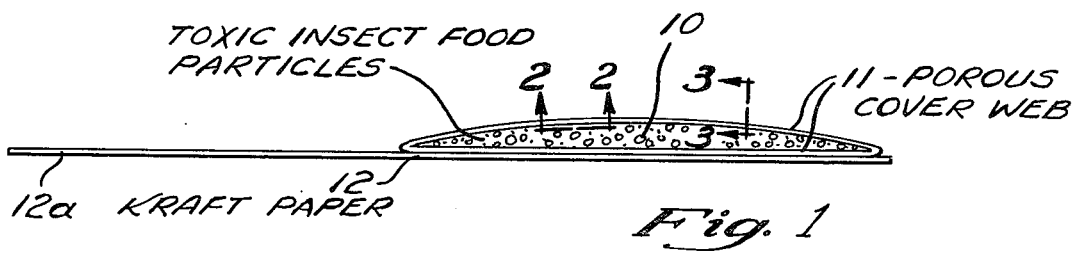
FIG. 1 is a longitudinal section through an insect exterminator pad in accordance with a first embodiment of this invention.

Referring first to FIG. 1, the insect exterminator pad shown there comprises a suitable quantity of poisonous, friable insect food particles 10 inside a porous cover web 11 of special construction, as explained hereinafter, and a bottom web 12. In one practical embodiment the poison food 10 is the product now sold under the name "Baygon". The bottom web 12 preferably is unbleached Kraft paper having a thickness within the range from about 0.002 inch to 0.008 inch. It is impenetrable by insects, is heat sealabe, flexible, foldable and printable, and has a compact, dense formation which may be calendered or uncalendered, with either wet strength or sized property.

Figure 2:
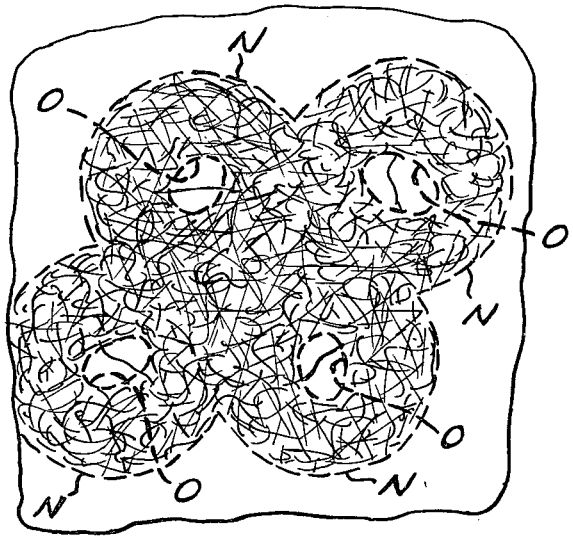
FIG. 2 is an enlarged, schematic plan view of the inner face of the top cover web in the FIG. 1 insect pad, taken from the line 2—2 in FIG. 1.

The porous web 11 is a paper of special construction having an inside layer (next to the food particles) that, when suitably magnified, in plan view looks like a group of interlaced, bowl-like bird's nests as shown at N in FIG. 2, each having a substantially oval opening O at the center. Each of these openings in the preferred embodiment has a major diameter of substantially 2 millimeters and a minor diameter of substantially 1 millimeter.

Figure 3:
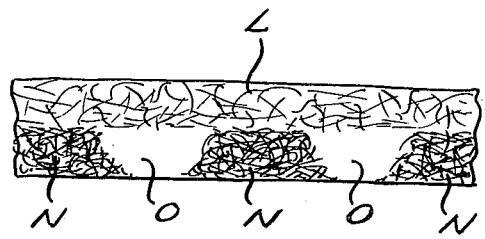
FIG. 3 is an enlarged, schematic, vertical cross-section through this cover web, taken along the line 3—3 in FIG. 1.

As shown in FIG. 3, the web 11 has an outer layer L (away from the food particles) that is made up of dispersed fibers waterlaid upon nests N and crossing over the openings O in the nests in random fashion. The fibers in this outer layer L are readily displaceable laterally by the feelers of *Blatella germanica* nymphs seeking to reach the toxic food particles through the openings O in the inner layer of the web.

Preferably, the complete thickness of the cover web 11 is within the range from substantially 0.0025 inch to 0.005 inch.

The feelers of *Blatella germanica* nymphs are very fine and much longer than the body of the insect, so they can penetrate without great difficulty through the fibrous outer layer L of the cover web and then through the openings O in the inner layer of this web to get at the poison food 10. The head of a *Blatella germanica* nymph is shaped generally like an isosceles triangle, with the mouth parts at the apex ranging in width from 0.1 millimeter to 0.2 millimeter, so that the nymph is able to insert his mouth parts through the fibrous outer layer L and through the much wider opening O in the inner layer.

In addition to enabling *Blatella germanica* nymphs to have ready access to the poison food 10, the fibers in the outer layer L of the cover web act to retain food particles inside the pad so as to avoid possible toxic effects to humans handling the pad. The interstices between the discrete fibers in the outer layer L enable the insect to see the food inside.

The cover web 11 may completely enclose the poison food 10, as shown in FIG. 1, or it may cover only the top of the food.

The bottom web 12 preferably is heat sealed to the cover web 11 around the latter's entire periphery, so that the only access to the food 10 is through the cover web 11 (the bottom web 12 being impenetrable by the insect). As shown in FIG. 1, the bottom web has a wing or extension 12a at one end which the user may grasp without touching the cover web 11, so as to substantially minimize the contact with the toxic contents of the pad.

Figure 4:
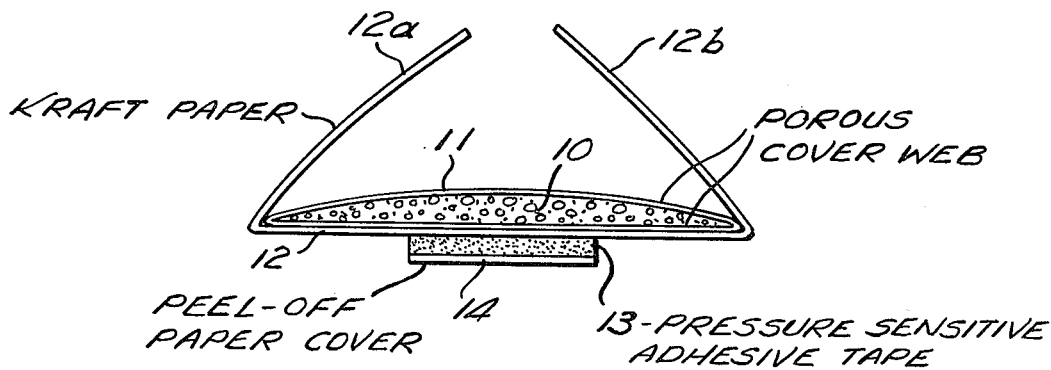
FIG. 4 is a view similar to FIG. 1 and showing a second embodiment of this invention.

Alternatively, as shown in FIG. 4, the bottom web 12 may have wings 12a and 12b at its opposite ends which may be folded over the top of the cover web 11 and the poison food 10 therein when the pad is being handled by humans. As shown in this figure, the bottom web 12 has a thin strip of double-faced, pressure sensitive adhesive tape 13 with a paper cover 14 that may be peeled off. When the peel-off cover 14 is removed, the tape 13 may be used to attach the pad to a water pipe, drain pipe, trap, or any other selected support surface located where *Blatella germanica* nymphs are expected.

The present insect exterminator pad may be any desired size, for example, as small as 1.5 inches square. In general, a greater number of small pads located in a given area have been found more effective than a smaller number of larger pads in that same area.

It is axiomatic that if the young nymphs are eliminated very near to their egg case source, the full grown mating adults will be decreased in exponential numbers. I have made extensive tests to prove this hypothesis. Counts of from 2 to 10 dead insects have been found upon or within an 8 inch circle of a single pad.

The present pad may be embodied in more complicated units than the single-pad units shown in FIGS. 1 and 4. For example, two pads as shown in FIG. 4 may be assembled together to provide a rectangular, open-ended, box-like structure presenting two feeding areas in a single unit.

I claim:

1. An insecticidal pad having a quantity of poison food particles covered by a paper web having openings on the inside which are substantially larger than the feelers and mouth parts of *Blatella germanica* cockroach nymphs, said web on the outside having dispersed fibers which overlie and cross over said openings in random fashion over substantially the complete cross-sectional area of said openings and which the feelers and mouth parts of said nymphs can readily displace laterally and penetrate between to reach the poison food through said openings.

2. An insecticidal pad according to claim 1, wherein said dispersed fibers on the outside of said web are waterlaid randomly over said openings on the inside of the web.

3. An insecticidal pad according to claim 1, wherein said web at the inside has interlaced fiber nests formed individually with said openings and individually surrounding said openings, and said dispersed fibers on the outside of the web are waterlaid randomly on said nests to overlie and cross over said openings in random fashion.

4. An insecticidal pad according to claim 3, wherein said openings are substantially oval, with a minor diameter of substantially 1 millimeter and a major diameter of substantially 2 millimeters.

5. An insecticidal pad according to claim 1, wherein said web has a thickness from the outside to the inside within the range from substantially 0.0025 inch to 0.005 inch to permit penetration through the complete thickness of the web by the feelers and mouth parts of *Blatella germanica* cockroach nymphs.

6. An insecticidal pad according to claim 1, and further comprising a bottom web sealed to said first-mentioned web, said bottom web being impenetrable by *Blatella germanica* nymphs.

7. An insecticidal pad according to claim 6, wherein said bottom web presents a wing projecting beyond one end of said first-mentioned web and foldable over the top of the latter.

8. An insecticidal pad according to claim 7, wherein said bottom web presents wings at its opposite ends projecting beyond said first-mentioned web and foldable over the top of the latter.

9. An insecticidal pad according to claim 5, and further comprising a Kraft paper bottom web heat sealed to said first-mentioned web around the latter's periphery, said bottom web being impenetrable by *Blatella germanica* nymphs.

10. An insecticidal pad according to claim 1, wherein:
said web has a thickness within the range from substantially 0.0025 inch to 0.005 inch;
said dispersed fibers on the outside of said web are waterlaid randomly over said openings;
and said web on the inside has interlaced fiber nests formed individually with said openings and surrounding said openings.

11. An insecticidal pad according to claim 10, wherein each of said openings is substantially oval, with a minor diameter of substantially 1 millimeter and a major diameter of substantially 2 millimeters.

* * * * *